United States Patent
Na et al.

[11] Patent Number: 5,755,103
[45] Date of Patent: May 26, 1998

[54] ROOM AIR CONDITIONER WITH STERILIZING APPARATUS

[75] Inventors: Jong-Ick Na; Seung-kwan Lee, both of Suwon, Rep. of Korea

[73] Assignee: Samsung Electronics Co., Ltd., Suwon, Rep. of Korea

[21] Appl. No.: 714,683

[22] Filed: Sep. 16, 1996

[30] Foreign Application Priority Data

Sep. 16, 1995 [KR] Rep. of Korea .................. 95-30346
Sep. 16, 1995 [KR] Rep. of Korea .................. 95-30347

[51] Int. Cl.⁶ .................. F24F 3/16; F25D 23/00
[52] U.S. Cl. .................. 62/78; 62/264
[58] Field of Search .................. 62/78, 264; 165/122; 422/121

[56] References Cited

U.S. PATENT DOCUMENTS

| | | | |
|---|---|---|---|
| 3,518,046 | 6/1970 | Cicirello | 62/78 |
| 4,990,313 | 2/1991 | Pacosc | 422/121 |
| 5,558,158 | 9/1996 | Elmore | 165/122 |

FOREIGN PATENT DOCUMENTS

| | | | |
|---|---|---|---|
| 75432 | 4/1988 | Japan | 62/78 |
| 404347425 | 12/1992 | Japan | 62/78 |

*Primary Examiner*—William Doerrler
*Attorney, Agent, or Firm*—Burns, Doane, Swecker & Mathis, L.L.P.

[57] ABSTRACT

A room air conditioner includes an evaporator and a fan which circulates air from the room through the evaporator and back into the room through an outlet. Water condensing on the evaporator is collected. Ultra-violet lamps are positioned within the air conditioner to sterilize the air passing therethrough and to sterilize the collected water.

3 Claims, 5 Drawing Sheets

ROOM AIR CONDITIONER WITH STERILIZING APPARATUS

BACKGROUND OF THE INVENTION

1. Field of the Invention

The present invention relates, in general, to room air conditioners.

2. Description of the Prior Art

As is well known to those skilled in the art, a separate-type room air conditioner continuously and repeatedly performs four operational steps, that is, compression, condensation, expansion and evaporation steps, in order to cool the room. The separate-type room air conditioner (hereinbelow, referred to simply as "the room air conditioner") generally comprises two units, that is, indoor and outdoor units. The indoor unit includes an evaporator where the refrigerant is evaporated and absorbs heat from the room air, while the outdoor unit includes a condenser, which condenses the refrigerant and dissipates heat from the refrigerant. The indoor and outdoor units have respective housings and are installed inside and outside the room, respectively.

The indoor unit of the room air conditioner comprises an evaporator, which is installed in the front section inside the housing and evaporates the refrigerant in order to cool the room air sucked into the housing. When the refrigerant in the evaporator absorbs heat from the drawn-in room air, moisture laden in the air is cooled and condensed thus generating condensed water. In order to collect the condensed water in the indoor unit, a water collecting means is provided under the evaporator. The cold room air processed by the evaporator is forcibly discharged into the room by the blowing force of a blower fan, which is installed in an appropriate position inside the housing of the indoor unit.

In operation of the above room air conditioner, the blower fan starts at the same time the air conditioner is turned on thus forcibly drawing the room air into the indoor unit. Inside the indoor unit, the evaporator absorbs heat from the drawn-in room air and cools the room air when the room air passes by the evaporator. The cold air in turn is forcibly discharged into the room by the blowing force of the blower fan thus cooling the room.

However, the above room air conditioner has the following problems. That is, when the air conditioner is turned off, for example, shut down in winter for a lengthy period of time, germs and fungi propagate in the air conditioner. When the air conditioner is again turned on in season, the germs and fungi emit an offensive odor and are discharged into the room along with the cold air thus being bad for health.

SUMMARY OF THE INVENTION

It is, therefore, an object of the present invention to provide a device and control method for sterilizing with ultraviolet rays the air and condensed water in air conditioners in which the above problems can be overcome and which prevents propagation of germs and fungi and removes the unpleasant odors caused by the germs and fungi in the air conditioners.

It is another object of the present invention to provide a device and control method for sterilizing the air and condensed water in air conditioners which effectively sterilizes both the floating germs and fungi, being not absorbed by the evaporator's surface but discharged into the room along with cold air, and the harmful germs and fungi laden in the condensed water in the water collecting means during a high-level cooling mode in which the compressor and blower fan are operated at rpms of higher than respective reference rpms preset according to a difference between a target room temperature and a present room temperature.

The sterilizing device for an air conditioner according to the primary embodiment of the present invention comprises a housing, an evaporator installed inside the housing and adapted for absorbing heat from room air thus cooling the room air, a blower fan generating a blowing force thus drawing the room air into the housing and promoting heat exchanging effect between the room air and the evaporator and forcibly discharging the cold room air into the room, and means for sterilizing the room air drawn into the housing, the sterilizing means being installed behind the evaporator inside the housing. The above sterilizing means is a ultraviolet (UV) lamp emitting ultraviolet rays into the air conditioner thus sterilizing the room air.

The method for controlling the sterilizing device according to the primary embodiment comprises the steps of setting an operational mode of the air conditioner, driving the compressor in order to perform a selected operational mode of the air conditioner, and driving the UV lamp when a predetermined time has been elapsed after the sensed temperature reached the target temperature and the compressor was turned off, thus destroying harmful germs and fungi drawn into the air conditioner during the operation of the compressor.

The above method further comprises the step of driving the UV lamp for a predetermined time prior to the start of the compressor according to the selected operational mode, thus destroying harmful germs and fungi propagated in the air conditioner during the stop of the air conditioner. The above predetermined time is about 40 seconds, which are necessary to collect condensed water generated during the operation of the compressor.

The sterilizing device for an air conditioner according to the second embodiment of the present invention comprises an evaporator, a blower fan, a condensed water collecting means, a louver controlling the direction of discharged cold air, first sterilizing means installed behind the evaporator and adapted for sterilizing room air drawn into the air conditioner, second sterilizing means installed under the condensed water collecting means and adapted for sterilizing both the cold air discharged into the room through the louver and the condensed water collected by the condensed water collecting means, and a first transparent window separating the second sterilizing means from the condensed water collecting means and transmitting the light of the second sterilizing means thus allowing the light to be radiated to the condensed water collecting means.

The above second sterilizing means is a ultraviolet lamp, which emits ultraviolet rays in order to sterilize the condensed water collected by the condensed water collecting means. The above sterilizing device further comprises a second transparent window, which is installed at a position near the louver and transmits the light of the second sterilizing means thus allowing the light to be radiated into the room.

The method for controlling the sterilizing device according to the second embodiment comprises the steps of setting an operational mode of the air conditioner, driving a compressor in order to perform a selected operational mode of the air conditioner, and destroying dust, harmful germs and fungi of being not absorbed by an evaporator's surface but discharged into the room along with cold water and sterilizing condensed water collected by condensed water collecting means.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
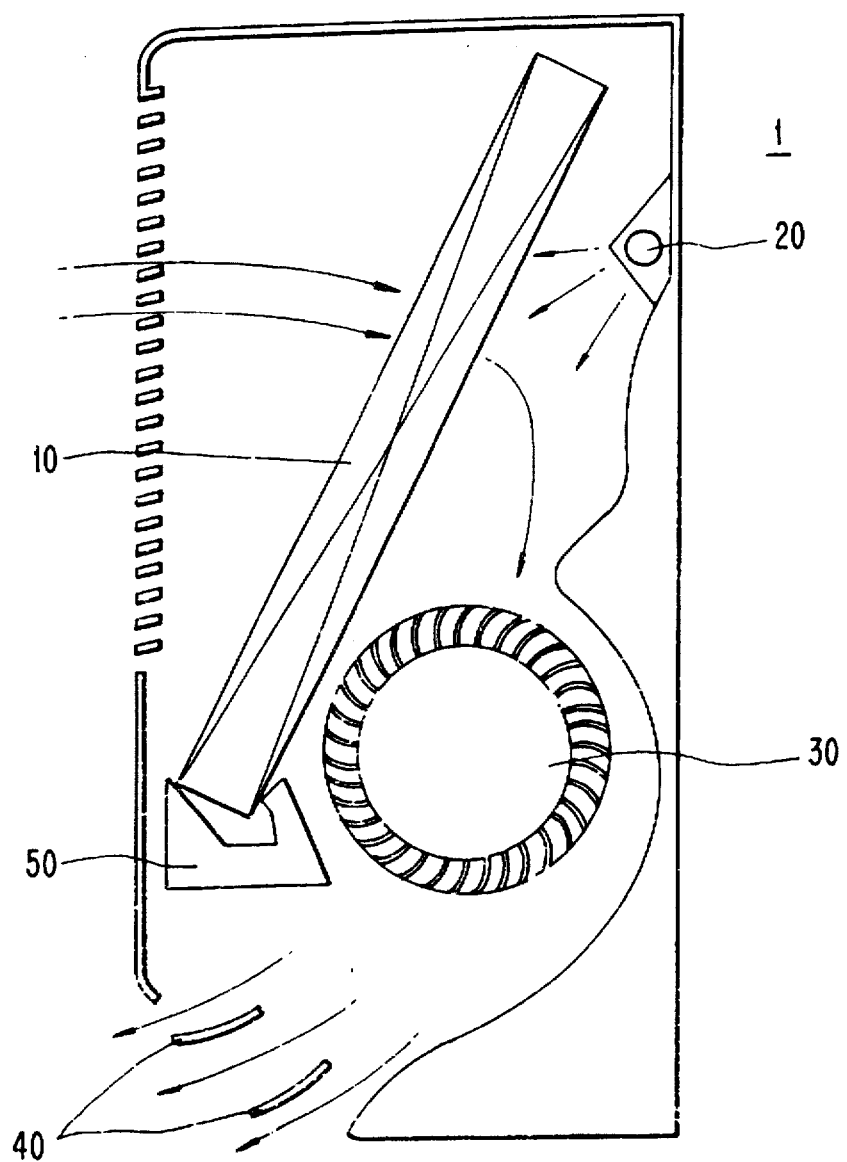
FIG. 1 is a view showing the construction of an indoor unit of the room air conditioner in accordance with the primary embodiment of the present invention.

FIG. 1 shows the construction of an indoor unit of the room air conditioner in accordance with the primary embodiment of the present invention.

As shown in FIG. 1, the indoor unit of the room air conditioner according to the primary embodiment of the invention comprises an evaporator 10, which is installed in the front section inside the housing 1 of the indoor unit and evaporates the refrigerant in order to cool the room air drawn into the housing 1. When the refrigerant in the evaporator 10 absorbs heat from the drawn-in room air, moisture laden in the air is cooled and condensed thus generating condensed water. In order to collect the condensed water, a water collecting means 50 form a trough 52 is provided under the evaporator 10. The cold room air processed by the evaporator 10 is forcibly discharged into the room by the blowing force of a blower fan 30. The fan 30 is installed in an appropriate position inside the housing 1 of the indoor unit. The indoor unit also includes a louver 40, which is installed in an appropriate position in the lower section of the housing 1 and controls the direction of the cold air, which is discharged into the room.

In accordance with the primary embodiment, a sterilizing means is installed in an appropriate position behind the evaporator 10 inside the housing 1 and sterilizes the cold air processed by the evaporator 10. In the present invention, an ultraviolet lamp 20 is preferably used as the sterilizing means. When the lamp 20, which is a lower pressure mercury discharge lamp, is turned on, the lamp 20 emits ultraviolet rays which kill germs and fungi and generate ozone in the indoor unit. That is, the ultraviolet rays emitted from the lamp 20 include sterilizing rays with 9 main wavelength of 253.7 nm to sterilize the floating germs and fungi laden in the room air by destroying genes (DNA) of the cells of the germs and fungi when the air passes by the lamp 20.

In addition, the ultraviolet rays of the lamp 20 include ozone generating rays with a wavelength of 185 nm to ionize oxygen in the air and generate ozone. The highly-oxidative ozone is brought into oxidization with the odor components in the air conditioner thus decomposing the odor components and removing the offensive odor.

Figure 3:
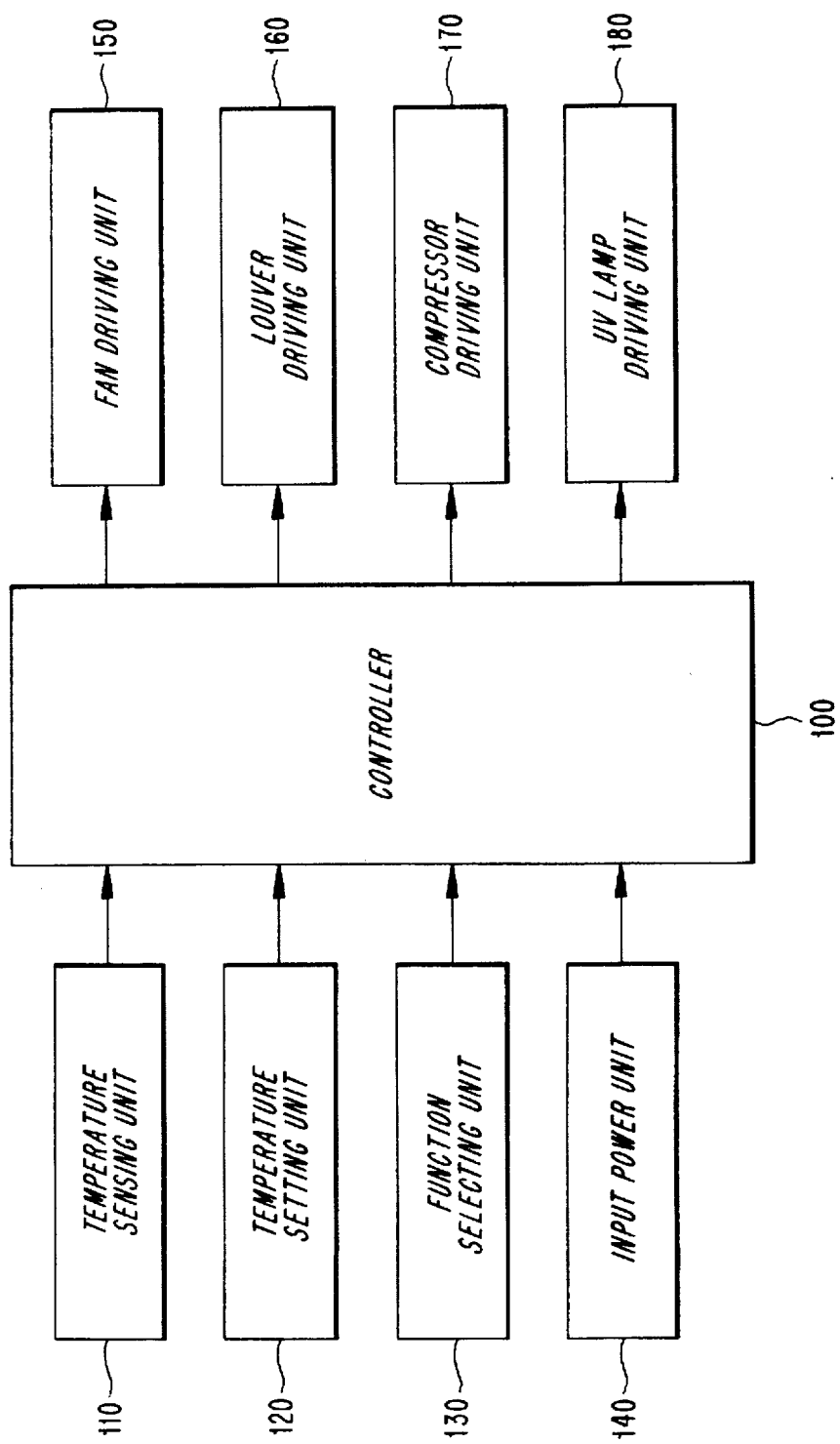
FIG. 3 is a block diagram of the control system used for controlling the air conditioner of the present invention.

FIG. 3 is a block diagram of the control system used for controlling the air conditioner of the present invention. The control system includes a controller 100 and a plurality of input and output units. The input units, which are connected to the input terminals of the controller 100, include a temperature sensing unit 110, a temperature setting unit 120, a function selecting unit 130 and an input power unit 140. The temperature sensing unit 110 senses a present room temperature, the temperature setting unit 120 sets a target room temperature, the function selecting unit 130 selects the operational modes and conditions of the air conditioner, and the input power unit 140 supplies electric power to the air conditioner. Meanwhile, the output units, which are connected to the output terminals of the controller 100, include a fan driving unit 150, a louver driving unit 160, a compressor driving unit 170 and a ultraviolet (UV) lamp driving unit 180. The fan driving unit 150 controls the rotating speed of the fan 30 and thus controls the air flow rate of the fan 30. The louver driving unit 160 controls the louver 40 in accordance with an operational condition selected by the function selecting unit 130 thereby controlling the direction of the discharged cold air. The compressor driving unit 170 drives the compressor in order to compress the refrigerant into a pressurized hot refrigerant, and the UV lamp driving unit 180 controls the operation of the UV lamp 20. The controller 100 controls rpms of the fan and compressor driving units 150 and 170 in accordance with a difference between the present room temperature sensed by the temperature sensing unit 110 and the target room temperature set by the temperature setting unit 120 and controls the operation of the UV lamp 20.

Figure 4:
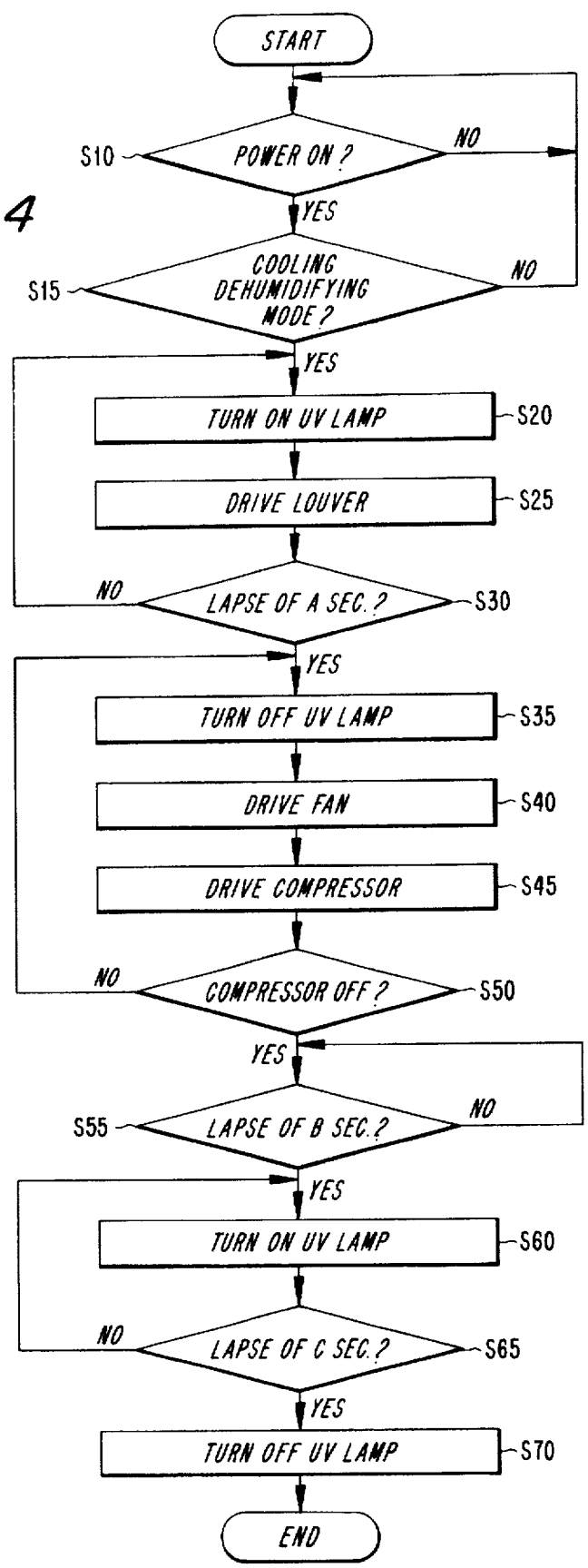
FIG. 4 is a flowchart of the control method of the air conditioner with the sterilizing device according to the primary embodiment of the present invention.

FIG. 4 is a flowchart of the control method of the air conditioner with the sterilizing device according to the primary embodiment of the present invention. As shown in FIG. 4, the air conditioner is turned on at step 10 so that the input power unit 140 supplies electric power to the air conditioner. Thereafter, at step 15, the controller 100 checks whether an operational mode, for example, cooling and dehumidifying mode, was selected by the function selecting unit 130.

When the cooling and dehumidifying mode was selected by the unit 130, the controller 100 outputs a first lamp start signal to the UV lamp driving unit 180 at step 20 in order to turn on the UV lamp 20. Upon receiving the lamp start signal, the unit 180 turns on the UV lamp 20 so that the lamp 20 emits ultraviolet rays and destroys the harmful germs and fungi prior to discharging of the cold air into the room. At step 25, the controller 100 outputs a louver control signal to the louver driving unit 160. Upon receiving the control signal, the unit 160 drives the louver 40 in order to open the air discharging port of the housing 1. The above pre-sterilizing process is performed for a predetermined time, for example, 10 minutes, prior to the start of the compressor thus primarily sterilizing and deodorizing the air conditioner.

At step 30, the controller 100 checks whether the pre-sterilizing process has been performed for a predetermined time. When the controller 100 determines that the pre-sterilizing process has not been performed for the predetermined time, the process is returned to step 20 in order to continue the pre-sterilizing process. However, when the controller 100 determines that the pre-sterilizing process has been performed for the predetermined time, the controller 100 outputs a lamp stop signal to the UV lamp driving unit 180 at step 35 in order to turn off the lamp 20. Upon receiving the lamp stop signal, the unit 180 turns off the lamp 20 and stops the operation of the sterilizing device. At step 40, the controller 100 compares the present room temperature sensed by the temperature sensing unit 110 with the target room temperature set by the temperature setting unit 120 and outputs a fan control signal to the fan driving unit 150. Upon receiving the lamp control signal, the fan driving unit 150 drives the fan 30. At step 45, the controller 100 outputs a compressor control signal to the compressor driving unit 170. Upon receiving the compressor control signal, the compressor driving unit 170 starts the compressor in order to perform a selected operational mode, for example, the cooling and dehumidifying mode. When the room temperature sensed by the temperature sensing unit 110 reaches the target room temperature by the cooling and dehumidifying operation, the compressor is turned off under the control of the controller 100. At step 50, the controller 100 checks whether the compressor was turned off.

When the controller 100 determines that the compressor has not been turned off, the process returns to step 35 in order to continue the cooling and dehumidifying operation. However, when the controller 100 determines that the compressor has been turned then, at step 55, the controller 100 checks whether the control system has been in a sterilizing standby state for a predetermined time, for example, about 40 seconds. When the temperature of the evaporator 10 in the cooling and dehumidifying operation is not higher than the dew point, moisture laden in the room air is condensed on the evaporator's surface due to a temperature difference between the room air and the evaporator 10 and generates condensed water. The above standby state for about 40 seconds is provided in order to collect the condensed water by the water collecting means 50.

When the controller 100 determines that the control system has not been in the sterilizing standby state for the predetermined time, the controller 100 controls the system in order to continue the sterilizing standby state. However, when the controller 100 determines that the control system has been in the sterilizing standby state for the predetermined time, at step 60, the controller 100 outputs a second lamp start signal to the UV lamp driving unit 180 under the condition that the compressor has been stopped. Upon receiving the lamp start signal, the lamp driving unit 180 drives the UV lamp 20 for a predetermined time, for example, about 20 seconds, in order to perform a post-sterilizing process in which the harmful germs and fungi inside the housing 1 are destroyed. At step 65, the controller 100 checks whether the post-sterilizing process has been processed for a predetermined time. When the controller 100 determines that the post-sterilizing process has not been processed for the predetermined time, the control process returns to step 60 in order to continue the post-sterilizing process. However, when the controller 100 determines that the post-sterilizing process has been processed for the predetermined time, at step 70, the UV lamp 20 is turned off under the control of the controller 100. The above process including the pre-sterilizing and post-sterilizing processes is repeated until the air conditioner is turned off.

In accordance with the above-mentioned sterilizing device and control method according to the primary embodiment of this invention, the harmful germs and fungi are effectively removed from the air conditioner so that the above device and method allows the healthful cooling and dehumidifying operation of an air conditioner to be effectively performed thereby promoting user's health.

Figure 2:
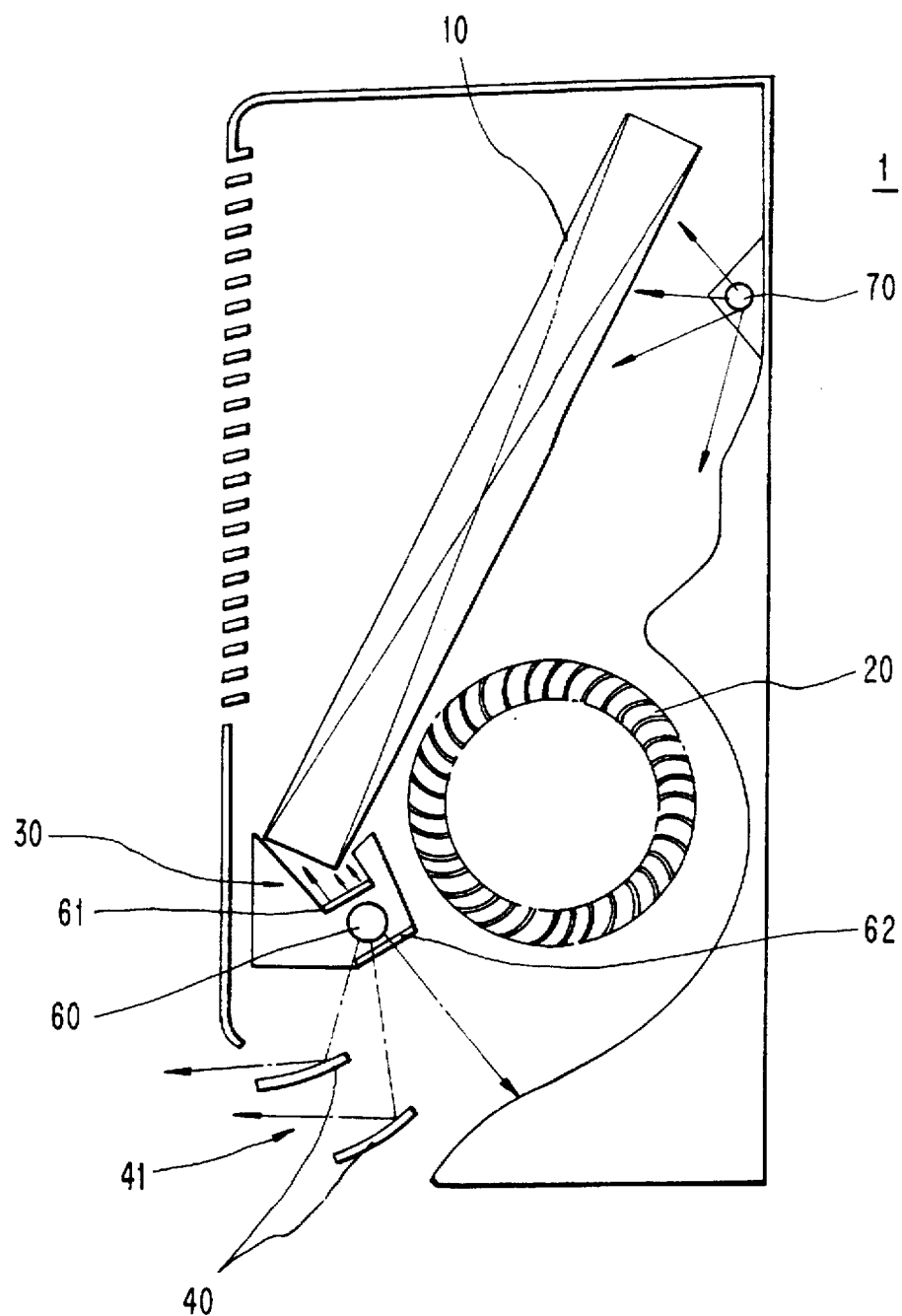
FIG. 2 is a view showing the construction of an indoor unit of the room air conditioner in accordance with the second embodiment of the present invention.

FIG. 2 shows the construction of the indoor unit according to the second embodiment of the present invention.

As shown in FIG. 2, the indoor unit of the room air conditioner according to the second embodiment of the invention comprises the evaporator 10, which is installed in the front section inside the housing 1 of the indoor unit and evaporates the refrigerant in order to cool the room air drawn into the housing 1. In order to collect the condensed water, the water collecting means 30 is provided under the evaporator 10. In order to forcibly discharge the cold room air processed by the evaporator 10 into the room, the blower fan 20 is installed in an appropriate position inside the housing 1 of the indoor unit. The louver 40, which is installed in an appropriate position in the lower section of the housing 1, controls the direction of the cold air discharged into the room.

In accordance with the second embodiment, the indoor unit further includes a UV lamp 60, which is installed on an appropriate position of the water collecting means 50. The UV lamp 60 has two transparent windows, that is, first and second windows 61 and 62. The above windows 61 and 62 are installed on positions near the evaporator 10 and air discharging port 41, respectively. The ultraviolet rays of the lamp 60 are radiated to the water collecting means 30 through the first window 61 which forms a wall of the trough 52, thus sterilizing the condensed water collected in the means 30 during a high-level cooling operation of the air conditioner. The ultraviolet rays of the lamp 60 are also radiated to the port 41 through the second window 62 thus sterilizing the cold air prior to discharging of the cold air into the room. The above first and second windows 61 and 62 are made of a UV glass which transmits the ultraviolet rays.

When the air conditioner is in a high-level cooling mode, the fan will be compressor are driven at rpms higher than respective low-level reference rpms, which high rpms were preset according to a difference between the present and target room temperatures, by at least one stage, thus reducing the room temperature to the target temperature in a short time. In the above high-level cooling mode, the blue light emitted from the UV lamp 60 is reflected by the louver 40 of the port 41 and is radiated into the room so that users feel visually refreshed.

In the above second embodiment, two UV lamps 60 are preferably installed on opposite sides of the water collecting means 30 so that the lamps 60 radiate ultraviolet rays to the port 41 and water collecting means 50 thus sterilizing the cold air passing through the port 41 and the condensed water collected by the means 30 during the high-level cooling mode.

In FIG. 2, the reference numeral 70 denotes a second UV lamp, which cooperates with the multi-stage compressor operated according to the difference between the sensed room temperature and the target room temperature and generates ultraviolet rays used for sterilizing the room air drawn into the housing 1.

Figure 5:
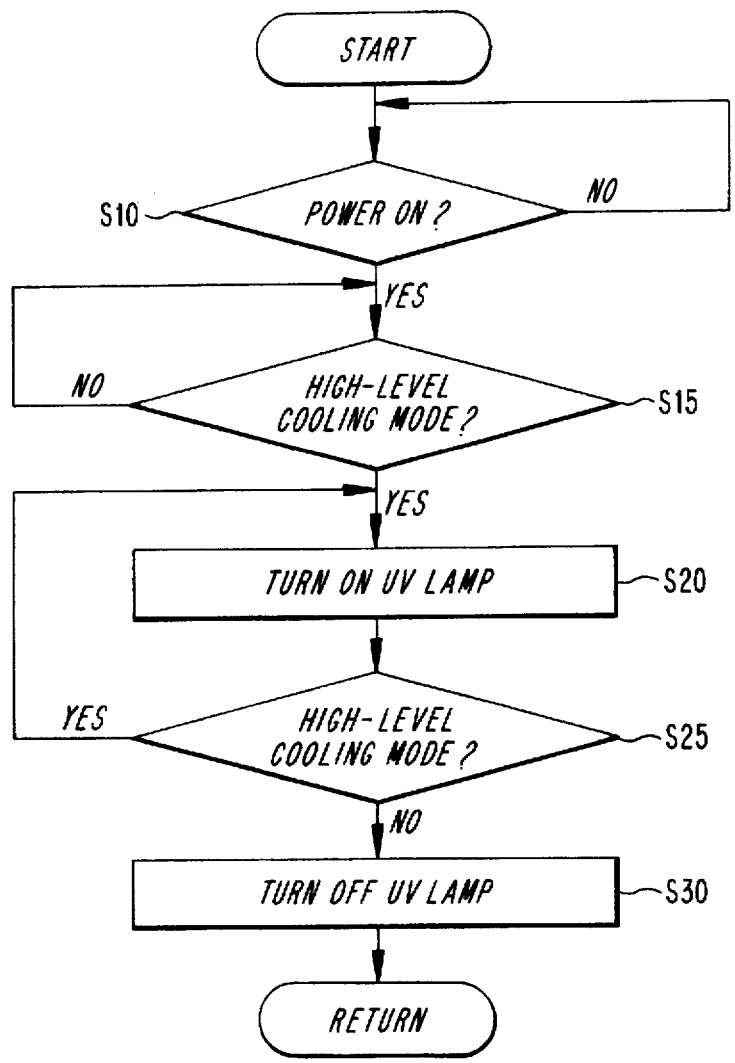
FIG. 5 is a flowchart of the control method of the air conditioner with the sterilizing device according to the second embodiment of the present invention.

FIG. 5 is a flowchart of the control method of the air conditioner with the sterilizing device according to the second embodiment of the present invention. In order to operate the UV lamps during a high-level cooling mode of the air conditioner, the air conditioner is turned on at step 10 so that the input power unit 140 supplies electric power to the air conditioner. Thereafter, a desired operational mode is selected by a user using the function selecting unit 130. At step 15, the controller 100 checks whether the selected operational mode is the high-level cooling mode. When controller 100 determines that the high-level cooling mode was selected, the controller 100 calculates a difference between the present room temperature sensed by the temperature sensing unit 110 and the target room temperature preset by the temperature setting unit 120. The controller 100, thereafter, drives the compressor and blower fan 20 at rpms of higher than the reference rpms, which were preset according to the difference between the present and target room temperatures, by at least one stage.

At step 20, the controller 100 outputs a lamp start signal to the lamp driving unit 180 in order to turn on the UV lamps 60 and 70. Upon receiving the lamp start signal, the unit 180 turns on the UV lamps 60 and 70. The lamps 60 and 70 emit ultraviolet rays thus killing the harmful germs and fungi laden in the room air, which is drawn into the housing 1 by the fan 20. The above ultraviolet rays also remove dust, germs and fungi, which are not absorbed by the evaporator's surface but are discharged into the room along with the cold air. The above ultraviolet rays further sterilize the condensed water collected by the water collecting means 30. That is, the ultraviolet rays emitted from the first UV lamp 60 of the water collecting means 30 are radiated to the water collecting means 30 through the first window 61 thus sterilizing the condensed water collected in the means 30. The ultraviolet rays of the lamp 60 are also radiated to the port 41 through the second window 62 thus sterilizing the cold air discharged into the room through the port 41. In the above state, the blue light emitted from the lamp 60 is reflected by the louver 40 and is radiated into the room so that users feel visually refreshed.

At step 25, the controller 100 checks whether the high-level cooling mode must be continued. When the controller 100 determines that the high-level cooling mode must be continued, process returns to step 20 in order to continuously drive the UV lamps 60 and 70 and continue the sterilizing operation. However, when the controller 100 determines that it is not necessary to continue the high-level cooling mode, the controller 100 outputs a lamp stop signal to the lamp driving unit 180 at step 30 in order to turn off the UV lamps 60 and 70. Upon receiving the lamp stop signal, the lamp driving unit 180 turns off the UV lamps 60 and 70 thus stopping the sterilizing operation.

In accordance with the sterilizing device and control method according to the second embodiment of the invention, the UV lamps are driven in order to sterilize the discharged cold air during a high-level cooling mode of the air conditioner. The above device and method thus completely kill harmful germs and fungi laden in the room air processed by the air conditioner and prevents diseases caused by the germs and fungi.

In accordance with the second embodiment, blue light emitted from the UV lamp 60 in the high-level cooling mode is reflected by the louver 40 and is radiated into the room so that users feel visually refreshed. The above UV lamp 60 thus promotes the cooling effect of the air conditioner in the high-level cooling mode.

What is claimed is:

1. A room air conditioner comprising:

a housing having an air inlet and outlet;

an evaporator in the housing; a fan for circulating room air into the housing, through the evaporator, and out through the outlet, the room air being cooled while passing through the evaporator;

a louver at the outlet for controlling a direction of flow of cool air passing through the outlet;

a collector defining a trough for collecting condensed water from the evaporator;

first sterilizing means disposed behind the evaporator for sterilizing room air passing through the evaporation;

second sterilizing means disposed under the collector and adjacent the outlet for sterilizing the condensed water and cool air passing through the outlet; and transparent window separating the second sterilizing means from the evaporator and defining a wall of the trough.

2. The air conditioner according to claims 1 wherein the second sterilizing means is an ultraviolet lamp for emitting ultraviolet rays.

3. The air conditioner according to claim 2 further including an additional transparent window arranged between the second sterilizing means and the louver, the louver positioned to reflect ultra-violet light into the room.

* * * * *